United States Patent
Wang et al.

(10) Patent No.: US 10,113,099 B2
(45) Date of Patent: Oct. 30, 2018

(54) HIGH PRESSURE HIGH TEMPERATURE (HPHT) AQUEOUS DRILLING MUD COMPOSITION AND PROCESS FOR PREPARING THE SAME

(71) Applicant: ISP INVESTMENTS INC., Wilmington, DE (US)

(72) Inventors: Janice Jianzhao Wang, Hockessin, DE (US); Jun Zheng, Morris Plains, NJ (US); Mohand Melbouci, Wilmington, DE (US)

(73) Assignee: ISP INVESTMENTS LLC, Wilmington, DE (US)

( * ) Notice: Subject to any disclaimer, the term of this patent is extended or adjusted under 35 U.S.C. 154(b) by 391 days.

(21) Appl. No.: 14/766,507

(22) PCT Filed: Feb. 18, 2014

(86) PCT No.: PCT/US2014/016835
§ 371 (c)(1),
(2) Date: Aug. 7, 2015

(87) PCT Pub. No.: WO2014/133824
PCT Pub. Date: Sep. 4, 2014

(65) Prior Publication Data
US 2015/0368538 A1  Dec. 24, 2015

Related U.S. Application Data

(60) Provisional application No. 61/769,816, filed on Feb. 27, 2013.

(51) Int. Cl.
| | |
|---|---|
| *C09K 8/68* | (2006.01) |
| *C09K 8/24* | (2006.01) |
| *C09K 8/18* | (2006.01) |
| *E21B 7/00* | (2006.01) |
| *E21B 43/16* | (2006.01) |

(52) U.S. Cl.
CPC .................. *C09K 8/24* (2013.01); *C09K 8/18* (2013.01); *E21B 7/00* (2013.01); *E21B 43/16* (2013.01)

(58) Field of Classification Search
CPC ... C09K 8/24; C09K 8/12; C09K 8/68; C09K 8/588; C09K 8/882; C09K 8/487; C09K 2208/12; C09K 2208/22; C09K 2208/26; C09K 2208/28; C09K 2208/32; C09K 2208/34; C09K 8/035; C09K 8/18; C09K 8/20; C09K 8/22; C09K 8/42; C09K 8/5083; C09K 8/512; C09K 8/528; C09K 8/605; C09K 8/608; C09K 8/685; C09K 8/887; E21B 43/16; E21B 7/00; E21B 33/13; E21B 43/26
See application file for complete search history.

(56) References Cited

U.S. PATENT DOCUMENTS

| | | | | |
|---|---|---|---|---|
| 3,850,817 A | * | 11/1974 | Barthel | C09K 8/05 507/145 |
| 5,234,753 A | * | 8/1993 | Williams, Jr. | C08K 5/13 252/8.62 |
| 2003/0022987 A1 | * | 1/2003 | Matz | A61K 8/8158 524/814 |

FOREIGN PATENT DOCUMENTS

| | | | |
|---|---|---|---|
| WO | WO2012061147 A1 | | 5/2012 |
| WO | WO2012/061147 | * | 5/2012 |

OTHER PUBLICATIONS

International Search Report, PCT/US2014/016835 dated May 22, 2014.

* cited by examiner

*Primary Examiner* — Kumar R Bhushan
(74) *Attorney, Agent, or Firm* — William J. Davis

(57) ABSTRACT

What is described herein is an aqueous high-temperature high-pressure (HTHP) stable drilling mud composition comprising (i) about 20 wt. % to about 80 wt. % of 0-60% w/w brine solution; (ii) about 0.1 wt. % to about 3 wt. % of butylated reaction product of p-cresol and dicyclopentadiene, a polymeric hindered phenol based antioxidant; (iii) about 0.1 wt. % to about 10.0 wt. % of triethanol amine, a chelating agent; (iv) (a) about 0.1 wt. % to about 10 wt. % of rheology modifier (RM); and/or (b) about 0.5 wt. % to about 30 wt. % of fluid loss additive (FLA); (v) about 20 wt. % to about 80 wt. % of weighting agent; (vi) about 0 wt. % to about 20 wt. % of drilling solid; and (vii) about 0 wt. % to about 50 wt % of water.

17 Claims, No Drawings

HIGH PRESSURE HIGH TEMPERATURE (HPHT) AQUEOUS DRILLING MUD COMPOSITION AND PROCESS FOR PREPARING THE SAME

FIELD OF THE INVENTION

The present application relates to drilling mud compositions, and more particularly, to an aqueous high pressure, high temperature (HPHT) drilling mud composition, process for preparing and method of use.

BACKGROUND OF THE INVENTION

Drilling fluids or mud are utilized when drilling a wellbore through rock formations in order to carry the rock cuttings created at the bit up to the surface where they are removed. To control downhole pressures, the fluid's density is usually increased by the addition of weight agents such as barite. The fluid should therefore exhibit sufficient viscosity to provide efficient cuttings removal (hole-cleaning), and sufficient gel strength for the stable suspension of barite. Drilling mud or fluids should also exhibit a low filtration rate (Fluid Loss) in order to maintain mud rheology and characteristics.

During the product manufacturing, storage and transportation, $O_2$ may migrate and dissolve into the products. At HPHT extreme condition $O_2$ will decompose and form oxygen free radical. Free radical may trigger polymer chain scission at the weak links along polymer backbone that leads to polymer degradation: polymer will quickly lose its properties such as molecular weights, mechanical strength, rheology and viscosity. In HTHP oilfield drilling application, the degradation of polymer will cause detrimental effects on the drilling mud properties, such as loss in mud viscosity and rheological characteristics. It is critical to solve these problems and maintain polymer initial thermal stability/performance during HT application. Antioxidants can interact with free radicals and terminate the chain scissions, therefore protect polymers from $O_2$ and thermal induced degradation and maintain their initial attributes.

During oilfield application, some metal oxides for example, iron oxides may be introduced into the drilling muds from all possible sources, e.g. weighting agents, pipes and drilling equipments. The contamination of metal oxides will likely trigger the polymer degradation. Chelating agents can be introduced into the mud formulation, which can sequestrate the metal impurities and prevent polymer decomposition from happening, therefore protect polymer and maintain drilling mud characteristics.

U.S. Pat. No. 7,384,892 assigned to Hercules Incorporated discloses a water-based drilling fluid composition including water and at least one rheology modifier and/or fluid loss control agent, and at least one other ingredient of polymeric additive, inorganic salts, dispersants, shale stabilizers, weighting agents, or finely divided clay particles, depending upon the desired attributes, wherein the rheology modifier and/or the fluid loss control agent comprises carboxymethylated raw cotton linters (CM-RCL) made from the baled raw cotton linters or comminuted raw cotton linters with increased bulk density.

An unpublished U.S. Provisional Application No. 61/638,142 dated Apr. 25, 2012 by International Specialty Products discloses compositions containing a synergistic combination with high fluid loss control and excellent retention of rheological properties even under HPHT conditions. In accordance with certain aspects, the present application is directed to a dispersion polymerization process and chemistry modification to make fluid loss control and rheological modifier polymers. Moreover, the fluid loss additives and rheology modifiers disclosed herein can be delivered to the field as water dispersions or dry powders, either separately or blended together, to facilitate handling and processing.

An unpublished U.S. Provisional Application No. 61/610,203 dated Mar. 13, 2012 by International Specialty Products discloses a high pressure, high temperature (HPHT) fluid loss additive and, in particular, to a fluid loss additive for oil-field drilling applications. In accordance with one aspect of the invention, the fluid loss additive comprises a terpolymer of acrylamide (AM), 2-acrylamido-2-methyl-propanesulfonic acid (AMPS) and a cationic monomer such as acrylamidopropyl-trimethyl ammonium chloride (APTAC) and/or methacrylamidopropyltrimethyl ammonium chloride (MAPTAC). In accordance with particularly useful embodiments, the polymer composition comprises from about 30-70 wt. % acrylamide, 30-70 wt. % AMPS, and 2-50 wt. % APTAC and/or MAPTAC. AMPS can be in either acid or neutralized form used in the polymerization process.

It has been very challenging to retain original properties of rheology modifiers and fluid loss additives of drilling mud composition and there has arisen a need for improved performance of water-based drilling mud/fluid composition comprising synthetic polymeric components that exhibits improved tolerance to high temperatures, high pressure, and metal impurities.

Surprisingly, we have found that the combination of antioxidants and chelating agents provided "double protection" for the polymers in the HPHT oilfield application.

Accordingly, it is an object of the present application to provide a drilling mud composition which is HPHT stable and capable of preventing degradation of polymer based components such as Fluid Loss Additives (FLA) and Rheology Modifiers (RM) that are essential part of drilling mud composition.

SUMMARY OF THE INVENTION

The primary objective of the present application is to prevent the degradation of rheology modifiers (RM) and fluid loss additives (FLA) by employing particular antioxidants and/or chelating agents, and wherein, said FLA and RM are employed in high-pressure high-temperature (HPHT) drilling mud compositions to provide required viscosity and rheology.

According to one important aspect, the present application provides an aqueous high-pressure high-temperature (HPHT) stable drilling mud composition comprising: (i) about 20 wt. % to about 80 wt. % of 0 to 60% w/w brine solution; (ii) about 0.1 wt. % to about 3 wt. % of butylated reaction product of p-cresol and dicyclopentadiene, a polymeric hindered phenol based antioxidant; (iii) about 0.1 wt. % to about 10.0 wt. % of triethanol amine, a chelating agent; (iv) (a) about 0.1 wt. % to about 10 wt. % of rheology modifier (RM); and/or (b) about 0.5 wt. % to about 30 wt. % of fluid loss additive (FLA); (v) about 20 wt. % to about 80 wt. % of weighting agent; (vi) about 0 wt. % to about 20 wt. % of drilling solid; and (vii) about 0 wt. % to about 50 wt % of water.

One important aspect of the present application is to provide an aqueous drilling mud composition which is HPHT stable and capable of preventing degradation of polymer based components such as Rheology Modifiers (RM) and Fluid Loss Additives (FLA) that are essential part of drilling mud composition.

Another important aspect of the present application is to provide an aqueous drilling mud composition which is suitable for high-pressure high-temperature (HPHT) drilling operations of >300° F. temperature.

In accordance with another aspect of the present application, a process for preparing an aqueous high-pressure high-temperature (HPHT) drilling mud composition comprises preparing a homogenous mixture of (i) about 20-80 wt % of 0-60% w/w brines solution (ii) about 0.1 wt. % to about 3 wt. % of butylated reaction product of p-cresol and dicyclopentadiene, a polymeric hindered phenol based antioxidant; (iii) about 0.1 wt. % to about 10.0 wt. % of triethanol amine, a chelating agent; (iv) (a) about 0.1 wt. % to about 10 wt. % of rheology modifier; and/or (b) about 0.5 wt. % to about 30 wt. % of fluid loss additive; (v) (a) about 20 wt. % to about 80 wt. % of weighting agent; and/or (b) about 0 wt. % to about 20.0 wt. % of drilling solid; and about 0 wt. % to about 50 wt % of water.

DETAILED DESCRIPTION OF THE INVENTION

While this specification concludes with claims particularly pointing out and distinctly claiming that, which is regarded as the invention it is anticipated that the invention can be more readily understood through reading the following detailed description of the invention and study of the included examples.

By the term "comprising" herein is meant that various optional, compatible components can be used in the compositions herein, provided that the important ingredients are present in the suitable form and concentrations. The term "comprising" thus encompasses and includes the more restrictive terms "consisting of" and "consisting essentially of" which can be used to characterize the essential ingredients such as water, antioxidant, rheology modifier (RM), fluid loss additive (FLA), drilling solid, weighting agent of the present aqueous BIT compositions.

All percentages, parts, proportions and ratios as used herein, are by weight of the total composition, unless otherwise specified. All such weights as they pertain to listed ingredients are based on the active level and, therefore; do not include solvents or by-products that may be included in commercially available materials, unless otherwise specified.

All references to singular characteristics or limitations of the present invention shall include the corresponding plural characteristic or limitation, and vice-versa, unless otherwise specified or dearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

The term "about" can indicate a variation of 10 percent of the value specified; for example about 50 percent carries a variation from 45 to 55 percent. For integer ranges, the term about can include one or two integers greater than and less than a recited integer.

As used herein, the words "preferred," "preferably" and variants refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

References herein to "one embodiment," "one aspect" or "one version" or "one objective" of the invention include one or more such embodiment, aspect, version or objective, unless the context clearly dictates otherwise.

All publications, articles, papers, patents, patent publications, and other references cited herein are hereby incorporated herein in their entireties for all purposes to the extent consistent with the disclosure herein.

The present application is directed to a thermally-stable fluid loss additive and, in particular, to a polymer suitable for use under HPHT conditions. HPHT refers generally to wells that are hotter or at higher pressure than most wells. In accordance with some aspects, HPHT may refer to a well having an undisturbed bottom hole temperature of greater than 300° F. [149° C.] and a pore pressure of at least 0.8 psi/ft (~15.3 lbm/gal). The present application describes an HPHT filtration test (i.e., HPHT fluid loss test) wherein the test is conducted at conditions that provide an indication as to how the composition would perform under HPHT conditions. In accordance with this test, static filtration behavior of water mud or oil mud is measured at elevated temperature, up to about 380° F. [193° C.] maximum [450° F. (227° C.) maximum if a special cell is used], usually according to the specifications of API with the exception of temperature and pressure. The standard API test is conducted at room temperature and a differential pressure of 100 psi. Although the HPHT test method described herein can simulate downhole temperature conditions, it does not simulate downhole pressure. Total pressure in a cell should not exceed 700 psi [4900 kPa], and the differential pressure across the filter medium is specified as 500 psi [3500 kPa]. Therefore, in the examples described herein, the HPHT fluid loss test is conducted at temperatures of at least 200° F. or more and at differential pressures of about 500 psi.

What is described herein is an aqueous high-pressure high-temperature (HPHT) stable drilling mud composition comprising: (i) about 20 wt. % to about 80 wt. % of 0 to 60% w/w brine solution; (ii) about 0.1 wt. % to about 3 wt. % of butylated reaction product of p-cresol and dicyclopentadiene, a polymeric hindered phenol based antioxidant; (iii) about 0.1 wt. % to about 10.0 wt. % of triethanol amine, a chelating agent; (iv) (a) about 0.1 wt. % to about 10 wt. % of rheology modifier (RM); and/or (b) about 0.5 wt. % to about 30 wt. % of fluid loss additive (FLA); (v) about 20 wt. % to about 80 wt. % of weighting agent; (vi) about 0 wt. % to about 20 wt. % of drilling solid; and (vii) about 0 wt. % to about 50 wt % of water.

One preferred embodiment of the present application provides an aqueous drilling mud composition comprising a Fluid Loss Additive (FLA) selected from the group consisting of: a terpolymer of (a) about 30 to about 70 wt. % of acrylamide (AM), (b) about 30 to about 70 wt. % of 2-acrylamido-2-methyl propanesulfonic acid (AMPS), salts thereof, and (c) about 2.0 to about 50 wt. % of cationic monomer selected from the group consisting of quaternized (meth)acrylate monomers, quaternized (meth)acrylamide monomers, diallyldimethyl ammonium chloride (DADMAC), dimethylaminoethyl methacrylate (DMAEMA), 3-methacryloyloxy-2-hydroxypropyl-trimethyl ammonium chloride, 3-acrylamido-3-methylbutyl-trimethyl ammonium chloride, N-methyl-2-vinyl pyridinium methyl sulfate, N-propyl acrylamido trimethylammonium chloride, 2-methacryloyloxy-ethyl trimethyl ammonium methosulfate, acrylamido-propyltrimethylammonium chloride (APTAC), methacrylamidopropyltrimethylammonium chloride (MAPTAC), and combinations thereof.

The fluid loss additive is thermally-stable, in particular, to a polymer suitable for use under HPHT conditions, and wherein HPHT refers generally to wells that are hotter or at higher pressure than most wells. In accordance with some aspects, HPHT may refer to a well having an undisturbed bottom hole temperature of greater than 300° F. [149° C.] and a pore pressure of at least 0.8 psi/ft (~15.3 lbm/gal).

Another important embodiment of the present application is directed to an aqueous drilling mud composition comprising a rheology modifier (RM) is selected from the group consisting of: (1) a terpolymer of (a) about 30 to about 70 wt. % of acrylamide (AM) (b) about 30 wt. % to about 70 wt. % of 2-acrylamido-2-methyl propanesulfonic acid (AMPS) and or salts thereof, and (c) about 0.01 wt. % to about 5 wt. % of hydrophobe; or (2) a terpolymer of (a) about 30 wt. % to about 70 wt. % of acrylamide (AM) (b) about 30 wt. % to about 70 wt. % of 2-acrylamido-2-methyl propanesulfonic acid (AMPS) and or salts thereof, and (c) about 0.01 wt. % to about 5 wt. % of long-chain $C_{12-25}$ alkyl acrylate selected from n-lauryl acrylate, n-hexadecyl acrylate, or n-stearyl acrylate.

The rheology modifier of the present application is appropriate for use as a high-performance rheology modifier for wellbore fluids, more particularly for water-based drilling fluid applications. The polymer disclosed herein is an effective thickener and suspension agent, with excellent salt-tolerance and thermal stability compared to conventional thickeners such as xanthan gum used in water-based drilling fluids. Moreover, the rheology modifier disclosed herein can be delivered to the field as an aqueous dispersion or a dry powder to facilitate handling and processing. The term "Rheology Modifier" as used herein refers to the terpolymer as defined herein.

The Rheology Modifier described herein exhibits rheological and thermal stability properties that are particularly useful in high-pressure/high-temperature drilling operations. The rheological profiles for materials produced in accordance with the present application were obtained across a wide shear rate spectrum including at a very low shear rate using advanced rheometers. Thermal stability studies were conducted using stainless-steel pressure aging cells in a roller oven. A static aging test was also conducted to understand the suspension power of the polymer during thermal aging. The Rheology Modifier disclosed herein exhibits a similar thickening efficiency and a rheological profile (i.e., shear thinning) as xanthan gum. However, after thermal aging up to 350° F. and higher for 16 hours, the RM polymer-containing drilling fluids disclosed herein were shown to maintain excellent rheology and suspension power, while the xanthan gum tends to degrade significantly at temperatures over 250-300° F. Moreover, the Rheology Modifier described herein exhibits surprising synergistic effects with Fluid Loss Additive (FLA) commonly used in water-based drilling fluids, further enhancing thermal stability.

In accordance with one aspect of the present application, a thermally-stable fluid loss additive (FLA) is employed for the preparation of aqueous drilling mud composition. The preferred FLA of the present application is a polymerized terpolymer of (a) about 30 to about 70 wt. % of acrylamide (AM), (b) about 30 to about 70 wt. % of sulfonic acid, salts thereof, and (c) about 2.0 to about 50 wt. % of cationic monomer.

In accordance with one aspect of the present application, a thermally-stable Rheology Modifier (RM) is employed for the preparation of aqueous drilling mud composition. The preferred RM of the present application is a polymerized terpolymer of (a) about 30 to about 70 wt. % of acrylamide (AM) (b) about 30 wt. % to about 70 wt. % of sulfonic acid and or salts thereof, and (c) about 0.01 to about 5 wt. % of hydrophobe.

The preferred sulfonic acid for the preparation Fluid Loss Additive (FLA) and/or Rheology Modifier (RM) is 2-acrylamido-2-methyl propanesulfonic acid (AMPS) and or salts thereof. The amount of AMPS used for the preparation is from about 30 wt. % to about 40 wt. %; or about 40 wt. % to about 50 wt. %; or about 50 wt. % to about 60 wt. %; or about 60 wt. % to about 70 wt. %.

However, it is contemplated to use various types of sulfonic acids, salts thereof for the preparation of suitable terpolymer as Fluid Loss Additive (FLA) and Rheology Modifier (RM) comprising the following generic structure I.

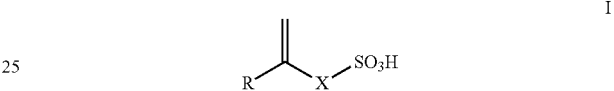

where R is hydrogen or lower alkyl ($C_1$-$C_5$) group; X is a direct bond or a functionalized or unfunctionalized, branched or linear, alkylene, cycloalkylene, alkenylene, or arylene group, typically having from 1 to 6 carbon atoms, wherein any of the before mentioned groups may be with or without heteroatoms groups. Salts of the foregoing acids may also be used. Specific examples of these monomers include, but are not limited to, sodium vinyl sulfonic acid/salts (SVS), sodium sulfonic acid/salts (SSS), styrenesulfonic acid/salts (SSA) and 1-Allyloxy 2-Hydroxy Propyl Sulfonic Acid and salts thereof (AHPS). AHPS is a particularly useful monomer that can be used instead of AMPS in any of the compositions disclosed herein. APHS is thermally and hydrolytically stable at high pH, saturated salt and elevated temperature conditions.

Other contemplated sulfonate or sulfonic acid based monomers employed for the preparation of FLA and/or RM terpolymer would include, but are not limited to, 2-chloroethylene sulfonic acid, ethylenesulfonic acid, ethylenedisulfonic acid, 1-nitriloethylenesulfonic acid, 2-formylethylenesulfonic acid, 1-carboxyethylenesulfonic acid, 1-propene-1-sulfonic acid, 1-propene-2-sulfonic acid, 2-formyl-1-methylethylene sulfonic acid, 1-carboxy-2-methylethylene sulfonic acid, 2-methyl-1,3-propenedisulfonic acid, 1-butene-1-sulfonic acid, 1-carboxy-2,2-dimethylethylene sulfonic acid, 1-pentene-1-sulfonic acid, 1-hexene-1-sulfonic acid, 2-(p-nitrophenyl)ethylene sulfonic acid, 2-phenylethylene sulfonic acid, 2-(p-hydroxyphenyl)ethylene sulfonic acid, 2-(2-aminophenyl)ethylene sulfonic acid, 1-methyl-2-phenylethylene sulfonic acid, 2-(p-methoxyphenyl)ethylene sulfonic acid, 4-phenyl-1,3-butadiene sulfonic acid, 2-(p-acetamidophenyl)ethylene sulfonic acid, 3-chloroallyl sulfonic acid, allyl sulfonic acid, 1-hydroxyallyl sulfonic acid, 2-cynoallyl sulfonic acid, 3-chloromethallyl sulfonic acid, 1-carboxyallyl sulfonic acid, 3-carboxyallyl sulfonic acid, methallyl sulfonic acid, 2-methylene-4,4-dimethyl-1,3-disulfo-pentene, 4-methylene-4,4-dimethyl pentene sulfonic acid, 1-hydroxy-3-phenylallyl sulfonic acid, 3-phenylallyl sulfonic acid, 2-benzylallyl sulfonic acid, 2-(p-methylphenoxy)allyl-sulfonic acid, 3-phenoxymethallyl sulfonic acid, 2-sulfoethyl acrylate, 2-sulfoethyl maleate, 3-sulfopropyl acrylate, 2-sulfonyl methacrylate, 3-sulfopropyl acrylate, 2-sulfo-1-(sulfomethyl)ethyl methacrylate, 3-sulfopropyl maleate, 4-sulfobutyl methacrylate, 2-(acyloxymethyl)-c-sulfuran, bis-2-sulfoethyl fumarate, 3-sulfopropyl itaconate, p-sulfophenyl acrylate, 2-(2-methylacryloxymethyl)-sulfofuran, bis-(2-sulfoethyl)itaconate, p-sulfophenyl methacrylate, bis-(3-sulfopropyl)maleate, bis-(3-sulfopropyl)fumarate, bis-(2-sulfopropyl)maleate, bis-(2-sulfopropyl)fumarate, 5-methyl-2-(methallyloxy) benzene sulfonic acid, bis-(2-sulfopropyl)-itaconate, Ar-(2-acryloyloxyethoxy)-2-naphthalene sulfonic acid, Ar-(2-methacryloyloxyethoxy)-naphthalene sulfonic acid, dodecyl-4-sulfopropyl itaconate, dodecyl-4-sulfobutyl itaconate, n-acryloyl taurine, allylthioethyl sulfonic acid, alloxy propene sulfonic acid, n-allyl-n-methylaminoethane-sulfonic acid, n-(methacrylamidomethyl)-sulfoacetamide, vinyloxybenzene sulfonic acid, n-(p-sulfophenyl)methacrylamide, p-[(2-vinylsulfonyl)ethoxy]-benzene sulfonic acid, n-methyl-n-(2-vinylsulfonyl-ethyl)-p-(sodiumsulfo)benzyl amine, dichlorostyrene sulfonic acid, 2-chlorostyrene sulfonic acid, p-styrene sulfonic acid, p-sulfonic acid, vinyltoluene sulfonic acid, 2-methyl styrene sulfonic acid, the potassium, sodium and ammonium salts of each of the foregoing compounds, 4-methylene-2,2,6,6-tetramethyl-3,5-disulfoheptene, allyloxyethyl sulfonic acid, allyl oxybenzene sulfonic acid, and styrene sulfonic acid.

The preferred sulfonic acid of the present application is selected from the following generic structure II.

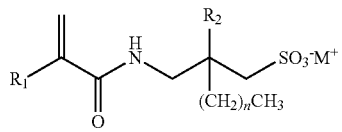

II where $R_1$ and $R_2$ are independently hydrogen or methyl group ($CH_3$), n is a number from 0 to 18. M is H or metal salt Na, K, $NH_4$ etc. For example, when n=0, $R_1$ is H, $R_2$ is methyl, the structure represents acrylamidopropanesulfonic acid (AMPS) and when n=2, $R_1$ is H, $R_2$ is methyl, the structure represents acrylamidobutanesulfonic acid, etc.

According to certain embodiment of the present application, it is contemplated to employ phosphoric acid, salts thereof from the generic structure of III for the preparation terpolymer which is used as FLA and/or RM. Examples of phosphonic acid and phosphonate monomers include but not limited to vinylidene diphosphonic acid, vinylphosphonic acid (VPA), styrenephosphonic acid (SPA), 4-vinylbenzyl-phoshonic acid (VBPA), or α-phenylvinylphosphonic acid (PVPA).

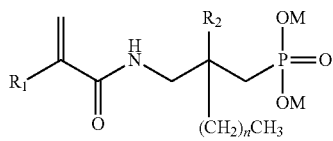

III

Wherein, $R_1$ is H or $CH_3$, X is O or NH,

One important embodiment of the present application discloses a suitable cationic monomer is employed for the preparation Fluid Loss Additive (FLA) is selected from the suitable quaternized (meth) acrylate or (meth) acrylamide monomer described under generic structure of IV.

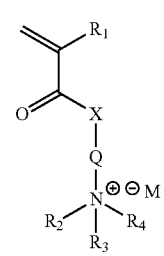

IV

Wherein, Q is selected from a functionalized and unfunctionalized alkylene, cycloalkylene, alkenylene, or arylene group, wherein any of the preceding groups may be with or without heteroatoms (more particularly, $C_1$-$C_6$ alkylene or cycloalkylene groups), $R_2$, $R_3$, and $R_4$ are independently selected from the group consisting of functionalized or unfunctionalized alkyl groups (more particularly, independently selected $C_1$-$C_8$ alkyl groups), and M is independently selected from the group consisting of alkali metal ions, alkaline earth metal ions, and the ammonium ion, and combinations thereof.

Examples of preferred quaternized (meth)acrylates and (meth)acrylamides include, but are not limited to, dimethylaminoethyl methacrylate (DMAEMA), 3-methacryloyloxy-2-hydroxypropyl trimethyl ammonium chloride, 3-acrylamido-3-methylbutyl-trimethyl-ammonium chloride, N-propyl-acrylamido-trimethyl ammonium chloride, 2-methacryloyloxy-ethyl trimethyl ammonium methosulfate, diallyldimethyl ammonium chloride (DADMAC), N-methyl-2-vinyl pyridinium methyl sulfate, acrylamidopropyltrimethylammonium chloride (APTAC), methacryl-amidopropyl-trimethylammonium chloride (MAPTAC), and combinations thereof. The most preferred cationic monomers for preparation of terpolymer of Fluid Loss Additive of the present application is diallydimethyl ammonium chloride (DADMAC) and acrylamidopropyltrimethylammonium chloride (APTAC). The amount of cationic polymer used for the preparation of terpolymer is from about 2 wt. % to about 10 wt. %; or about 10 wt. % to about 20 wt. %; or about 20 wt. % to about 30 wt. %; or about 30 wt. % to about 40 wt. %; about 40 wt. % to about 50 wt. %.

Suitable hydrophobic monomers employed for preparing desired Rheology Modifier (RM) polymer would include, but are not limited to, alkyl chain in linear, branched, or cyclic form, include without limitation the higher alkyl esters of α,β-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, the ethyl half ester of maleic anhydride, diethyl maleate, and other alkyl esters derived from the reactions of alkanols having from 8 to 25 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-o-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; α-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and Ar-alkylstyrenes such as t-butyl styrene. Of the foregoing hydrophobic monomers, the alkyl esters of acrylic acid and methacrylic acid wherein the alkyl has from 8 to 25 carbon atoms are preferred. Stearyl acrylate, n-lauryl acrylate, n-hexa-decyl acrylate are the most preferred. Such long chain acrylate could be in the linear or branched form for alkyl chains. The preferred range of hydrophobe for the preparation of terpolymer is from about 0.01 wt. % to about 1 wt. % or about 1 wt. % to about 2 wt. % or about 2 wt. % to about 3 wt. % or about 3 wt. % to about 4 wt. % or about 4 wt. % to about 5 wt. %.

The Rheology Modifiers (RM) of the present application typically have a molecular weight (MW) over 1,000,000 daltons, more particularly from about 2,000,000 to 20,000,000 daltons, and in certain cases from about 3,000,000 to Ser. No. 15/000,000 daltons as determined by GPC. One method for determining molecular weight is as follows: Samples are prepared as 0.15% (w/v) solution of polymer in 50/50 water/methanol mobile phase. The sample is mixed on a rotating wheel until dissolved and then filtered and injected into the GPC system at 0.5 mL/min flow rate for analysis. Molecular weight values are determined relative to PEO/PEG standards injected in the beginning and end of the sample analysis. A Shodex degasser and Waters Empower 2 software inter-phased with Waters pump and auto-sampler can be used.

The fluid loss additives described herein typically have an average molecular weight (MW) over 3,000 daltons, particularly over 10,000 daltons, more particularly 10,000 daltons and in certain preferred embodiments of the application, from about 500,000 daltons to Ser. No. 10/000,000 daltons as determined by GPC techniques that know for a person skilled in the art.

Moreover, the compositions can be produced at relatively high polymer solids (e.g., 15-35% in water dispersion form) while still providing acceptable bulk viscosity for processing the water dispersion (e.g., spray drying). The bulk viscosity of the dispersion polymer makes it practical to manufacture such rheology modifiers on commercial scale. The combination of high-molecular weight and incorporation of hydrophobes can be a key factor in the improved properties associated with the Rheology Modifier described herein. Addition of the Rheology Modifier to a drilling fluid has been found to impart reduced Fluid Loss as well in addition to desired rheological characteristics for hole cleaning and weight material suspension. Furthermore, the rheological and leak-off reduction characteristics of solutions of the Rheology Modifier are very appropriate for its use in fracturing fluids.

According to one different embodiment it is contemplated that besides Rheology Modifier (RM), other water-soluble polymers may be added to the water-based wellbore fluid to impart viscous properties, solids-dispersion and/or filtration control to the fluid. A wide range of water-soluble polymers may be used including cellulose derivatives such as carboxymethyl cellulose, hydroxyethylcellulose, carboxymethylhydroxyethyl cellulose, sulphoethylcellulose; starch derivatives (which may be cross-linked) including carboxymethyl starch, hydroxyethylstarch, hydroxypropyl starch; bacterial gums including xanthan, welan, diutan, succinoglycan, scleroglucan, dextran, pullulan; plant derived gums such as guar gum, locust-bean gum, tara gum and their derivatives; synthetic polymers and copolymers other than the Rheology Modifier.

The drilling mud composition of the present application may optionally comprise at least one polysaccharide selected from the group including but not limited to polyanionic cellulose (PAC), hydroxyethyl cellulose (HEC), Hydroxypropyl cellulose (HPC), carboxymethyl hydroxyethyl cellulose (CMHEC), carboxymethyl cellulose (CMC), xanthan gum, guar gum, and mixtures thereof.

The terpolymers according to the present application may be readily synthesized by procedures known by those skilled in the art, and include but not limited to free radical polymerization, solution polymerization, emulsion polymerization, ionic chain polymerization, bulk polymerization, suspension polymerization or precipitation polymerization and inverse emulsion polymerization (including Liquid dispersion polymerization (LDP), and "dispersion polymerization" (water-in-water)). Dispersion polymerization is a particularly useful method for producing the polymers described herein. "Dispersion polymer" means a water-soluble polymer dispersed in an aqueous continuous phase containing one or more inorganic salts. In the process of dispersion polymerization, the monomer and the initiator are both soluble in the polymerization medium, but the medium is a poor solvent for the resulting polymer. Accordingly, the reaction mixture is homogeneous at the onset, and polymerization is initiated in a homogeneous solution. Depending on the solvency of the medium for the resulting oligomers or macro radicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of spherical particles. Typically, the particles range from about 0.1-500 microns, more particularly from about 1-200 microns. In dispersion polymerization, the variables that are usually controlled are the concentrations of the stabilizer, the monomer and the initiator, solvency of the dispersion medium, and the reaction temperature and choice of initiator. It has been found that these variables can have a significant effect on the particle size, the molecular weight of the final polymer particles, and the kinetics of the polymerization process.

The terpolymers of this application are prepared at a pH greater than 5, preferably at a pH of about 6-8. After polymerization the pH of the dispersion may be adjusted to any desired value as long as the polymer remains insoluble to maintain the dispersed nature. Preferably, polymerization is conducted under inert atmosphere with sufficient agitation to maintain the dispersion.

Other preferred polymerization techniques employed to carry out the said terpolymer of present application is duly disclosed in (1) "Principles of Polymerization" 4$^{th}$ edition, 2004, Wiley by George Odian and (2) WO2012061147A1 assigned to ISP Investments Inc. is referred and disclosed herein in its entirety. Further, the polymerization of terpolymer of the present application optionally may require a suitable catalysts or initiators, stabilizers, salts, pH adjusting agents, co-dispersants, thickeners, solvents, acidic agents, basic agents, and/or photoinitiators depending on type of polymerization technique being employed, and one skilled in the art can easily derive such information from the relevant literature known in the prior-art or from "Principles of Polymerization" 4$^{th}$ edition, 2004, Wiley by George Odian.

In a different embodiment, the aqueous drilling mud composition is used in combination with a brine solution during drilling operations which may comprise water, seawater or a solution of a salt or a solution of a combination of salts or a brine solution. Generally, the brine solution is present in the wellbore fluid in an amount in the range of from about 20 to 80% by weight of the brine solution, preferably about 20 to 60% by weight. The concentration of brine solution can be from about 0 to 60% by weight. The brine solution may be an aqueous solution of one or more density-increasing water-soluble salt. The density increasing water-soluble salt may be selected from the group consisting of alkali metal halides (for example, sodium chloride, sodium bromide, potassium chloride, potassium bromide, magnesium chloride, ammonium chloride) alkali metal carboxylates (for example, sodium formate, potassium formate, caesium formate, sodium acetate, potassium acetate or caesium acetate), sodium carbonate, potassium carbonate, alkaline earth metal halides (for example, calcium chloride and calcium bromide), and zinc halide salts (zinc chloride, zinc bromide) and mixtures thereof.

The aqueous high-temperature high-pressure (HTHP) stable drilling mud composition of present application comprises at least one weight agent to provide the increased density to the composition. The weighting agent is primarily used to prevent the entry of fluids formed during drilling operations.

The weighting agent is a salt selected from the group consisting of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations thereof.

In an exemplary embodiment, the weighting agent may be selected from the group including but not limited to barite, hematite, ilmenite, calcite, dolomite, siderite, hausmannite, manganese oxide, iron oxide, sized calcium carbonate, magnesium carbonate, suspended metal particles, aqueous soluble organic and inorganic salts and mixtures thereof.

According to another embodiment of the present application, at least one drilling solid agent is employed to provide enhanced viscosity, density, gel strength to the drilling mud, and thus gives it good suspensive capacity to oppose any settling of the cuttings.

Examples of suitable drilling solid may be selected from the group consisting of but not limited to clays, bentonite, attapulgite, hectorite, sepiolite, and the synthetic minerals Laponite™ (a synthetic hectorite ex Rockwood Additives Limited) and mixed metal hydroxides. Other clays which may be present in the fluids include kaolinite and illite which can be contaminants arising from drilled shale formations. Some of the shale cuttings inevitably become dispersed in a wellbore fluid as fine illite and kaolinite clay particles. The preferred drilling solid of the present application is finely divided clay particles selected from the group consisting of bentonite, sodium bentonite, attapulgite, sepiolite, saponite, hectorite and mixtures thereof.

In HTHP oilfield drilling applications, the degradation of polymers such as Rheological Modifiers and Fluid Loss Additives will cause detrimental effects on the drilling mud properties such as loss in viscosity and/or rheological properties. In such HTHP condition, the possibility for the decomposition of $O_2$ molecules is relatively more than the normal or ambient conditions. The HTHP condition facilitates the formation of oxygen free radicals by degrading the $O_2$ molecules, and the resulted oxygen free radicals may trigger the polymer chain scission at the weak links along polymer backbone leading to polymer degradation and loss of polymeric properties such as molecular weights, mechanical strength, rheology, viscosity and etc. Therefore, it is very important to retain polymeric properties of FLA and RM in an HPHT and initial thermal stability conditions. The present application addresses this issue by providing an aqueous HTHP stable drilling mud composition comprising an antioxidant component which is capable of protecting polymer based FLA and RM from oxygen free radicals and thermal induced degradation by interacting with free radicals to terminate the chain scissions.

The preferred antioxidant component for the present application is selected from sterically hindered polyphenols. Such hindered phenolic antioxidants include, but are not limited to, ortho-alkylated phenolic compounds such as 2,6-di-tertbutylphenol, 4-methyl-2,6-di-tertbutylphenol, 2,4,6-tri-tertbutylphenol, 2-tert-butylphenol, 2,6-diisopropylphenol, 2-methyl-6-tert-butylphenol, 2,4-dimethyl-6-tert-butylphenol, 4-(N,N-dimethylaminomethyl)-2,6-di-tertbutyl phenol, 4-ethyl-2,6-di-tertbutylphenol, 2-methyl-6-styrylphenol, 2,6-distyryl-4-nonylphenol, 2,2'-ethylidene-bis-(4,6-di-tert-butylphenol), 2,2'-methylene-bis-(4-ethyl-6-tert-butylphenol), 2,2'methylene-bis-(4-methyl-6-tert-butylphenol), 2,2'methylene-bis-[4-methyl-6-(1-methylcyclohexyl)]-phenol, 4,4'-butylidene-bis-(6-tert-butyl-3-methylphenol), 4,4'methylene-bis-(2,6-di-tert-butylphenol), N,N'-1,6-hexamethylene-bis-3-(3,5-di-tert-butyl-4-hydroxyphenyl)propionamide (IRGANOX 1098), 1,6-hexamethylene-bis-(3,5-di-tert-butyl-4-hydroxyhydrocinnamate (IRGANOX 259), triethylene glycol-bis-[3-(3-tert-butyl-4-hydroxy-5-methylphenyl)]propionate (IRGANOX 245), N,N'-bis-(3,5-di-tert-butyl-4-hydroxyhydrocinnamoyl)hydrazine (IRGANOX MD 1024) and nickel or calcium-bis-[O-ethyl(3,5-di-tert-butyl-4-hydroxybenzyl)phosphonate (IRGANOX 1425), tetrakis-[methylene(3,5-di-tert-butyl-4-hydroxyhydrocinnamate)]-methane (IRGANOX 1010), 1,3,5-trimethyl-2,4,6-tris(3',5'-di-tert-butyl-4'-hydroxybenzyl)benzene (IRGANOX 1330), 1,3,5-tris(3,5-di-tert-butyl-4-hydroxybenzyl)isocyanurate, 1,1,3tris(5-tert-butyl-4-hydroxy-2-methylphenyl)butane; 1,1,5,5-tetra-(5-tert-butyl-4-hydroxy-2-methylphenyl)pentane; or ethylene glycol-bis-[3,3-bis-(3'-tert-butyl-4'-hydroxyphenyl)-butyrate]; 2,2-bis-(3,5-di-tert-butyl-4-hydroxybenzyl)-malonic acid-dioctadecyl ester: esters of beta-(3,5-di-tert-butyl-4-hydroxyphenyl) propionic acid with alcohols such as octadecanol or pentaerythritol; Spiro compounds such as 3,9-bis-(3,5-di-tert-butyl-4-hydroxyphenyl)-2,4,8,10-tetra-oxaspiro[5,5]-undecane, styrenated phenol, such as Wingstay S (Goodyear), alkylated hindered phenols, such as Wingstay C (Goodyear), butylated reaction product of p-cresol and dicyclopentadiene, such as Wingstay L and their analogs and homologs. Mixtures of two or more such hindered polyphenolic compounds are also suitable. Other preferred hindered polyphenols of present application include that are described in U.S. Pat. No. 5,362,783 assigned to "The Dow Chemical Company" is referred and disclosed herein in its entirety. In the practice of the present application, the most preferred hindered polyphenol is butylated reaction product of p-cresol and dicyclopentadiene, a polymeric hindered phenol, commercially available as Wingstay L.

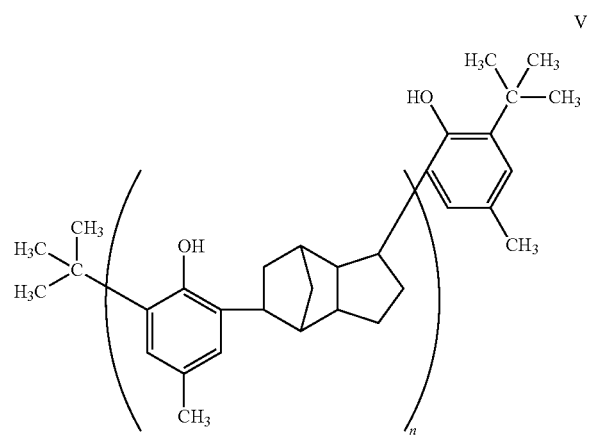

V

The butylated reaction product of p-cresol and dicyclopentadiene (Wingstay L) employed in the present application is believed to have the structure V. Wherein n is at least 1, preferably greater than 1, more preferably from about 1 to about 10. In general, the polymeric hindered phenol has a molecular weight in the range of from several hundred to about several thousand, such as from about 100 to about 10000, preferably from about 200 to about 6000.

The preferred range of antioxidant for the preparation of drilling mud composition is from about 0.01 wt. % to about 3 wt. %. Other preferred ranges would include about 0.1 wt. % to about 1 wt. %, about 1 wt. % to about 2 wt. % or about 2 wt. % to about 3 wt. %.

Inorganic metal impurities, for example, $Fe_3O_4$ may be introduced into the drilling muds from possible sources including but not limited to weighting agents, pipes and drilling equipments during oil drilling application, such in metal impurities would facilitate the polymer degradation. Therefore, suitable chelating agents can be introduced into the drilling mud composition, which can sequestrate the metal impurities and prevent polymer decomposition and can retain the polymeric characteristics of Rheology Modifiers (RM) and Fluid Loss Additives (FLA) of the present application. The preferred sequestering or chelating agent for the present application is triethanolamine.

The preferred range of triethanolamine for the preparation of drilling mud composition is from about 0.01 wt. % to about 10 wt. %. Other preferred ranges would include about 0.1 wt. % to about 1 wt. %, about 1 wt. % to about 2 wt. % or about 2 wt. % to about 3 wt. % or about 3 wt. % to about 4 wt. % or about 4 wt. % to about 5 wt. %, about 5 wt. % to about 6 wt. %, about 6 wt. % to about 7 wt. %, about 7 wt. % to about 8 wt. %, about 8 wt. % to about 9 wt. %, or about 9 wt. % to about 10 wt. %.

Other suitable organic or inorganic sequestering or chelating agents can selected from the group comprising gluconates, sorbitals, mannitols, carbonates, hydroxamates, catechols, α-amino carboxylates, alkanolamines, metal-ion sequestrants, hydroxy-carboxylic acids, aminocarboxylic acids, amino polycarboxylic acids, polyamines, polyphosphates, phosphonic acids, crown ethers, amino acids, polycarboxylic acids, cyclodextrin, phosphonates, polyacrylates or polymeric polycarboxylates, condensed phosphates, However, the particular sequestering or chelating agents would include but are not limited to acetic acid, adenine, adipic acid, alanine, alanine, albumin, arginine, ascorbic acid, asparagine, aspartic acid, ATP, benzoic acid, n-butyric acid, casein, citraconic acid, citric acid, cysteine, dehydracetic acid, desferri-ferrichrysin, desferri-ferrichrome, desferri-ferrioxamin E, 3,4-dihydroxybenzoic acid, diethylenetriaminepentaacetic acid (DTPA), hydroxylpropylenediaminetetraacetic acid (DPTA), dimethylglyoxime, dimethylpurpurogallin, EDTA, glutamic acid-N,N-diacetic acid tetrasodium salt (GLDA-$Na_4$), formic acid, fumaric acid, globulin, gluconic acid and its alkali metal salts, glutamic acid, glutaric acid, glycine, glycolic acid, glycylglycine, glycylsarcosine, guanosine, histamine, salicylic, pimalic acid sulfamic acid, salicylic, glutaric, malonic acid, 1,10-phenanthroline, 2-pyridylacetic acid, 5-formylfuran sulfonic acid, N-tris(hydroxymethyl)methyl-2-aminoethanesulfonic acid, itaconic acid, chelidonic acid, 3-methyl-1,2-cyclopentanedione, glycolamide, histidine, 3-hydroxyflavone, inosine, iron-free ferrichrome, isovaleric acid, itaconic acid, kojic acid, lactic acid, leucine, lysine, maleic acid, malic acid, methionine, methylsalicylate, nitrilotriacetic acid (NTA), ornithine, orthophosphate, oxalic acid, oxystearin, phenylalanine, phosphoric acid, phytate, pimelic acid, pivalic acid, polyphosphate, proline, propionic acid, purine, pyrophosphate, pyruvic acid, riboflavin, salicylaldehyde, salicyclic acid, sarcosine, serine, sorbitol, succinic acid, tartaric acid, tetrametaphosphate, thiosulfate, threonine, trimetaphosphate, triphosphate, tryptophan, uridine diphosphate, uridine triphosphate, n-valeric acid, valine, xanthosine, triethylenetetraaminehexaacetic acid, N,N'-bis(o-hydroxybenzyl)ethylenediamine-N,N' diacteic acid, ethylenebis-N,N'-(2-o-hydroxyphenyl)glycine, acetohydroxamic acid, desferroxamine-B, disulfocatechol, dimethyl-2,3-dihydroxybenzamide, mesitylene catecholamide (MECAM), 1,8-dihydroxynaphthalene-3,6-sulfonic acid, and 2,3-dihydroxynaphthalene-6-sulfonic acid, siderophores molecules, N,N-dicarboxymethyl-2-aminopentanedioic-acid, diethylenetriaminepentaacetic-acid, ethylene-diaminetetraacetates, nitriloacetates or N-(2-hydroxyethyl)nitrilodiacetates), 2,2-dichloropropionic acid, 2,2-dibromobutyric acid, trifluoroacetic acid, tribromoacetic acid, trichloroacetic acid, 2,3-dibromopropionic acid, 2,2-dichlorovaleric acid, 3-nitropropionic acid, triiodoacetic acid, 3(2,2,2-trichloroethoxy)propionic acid, 4-nitro-2-chlorobutyric acid, 2-bromo-2-nitropropionic acid, 2-nitroacetic acid, 2,4-dihydroxyphenyl acetic acid, 2,4-dichlorophenyl acetic acid, 3(2',4'-dibromophenoxy)propionic acid, 3(3',5'-dinitrophenoxy)propionic acid, 3-phenyl-2,3-dibromopropionic acid, 3,5-dinitrosalicylic acid, 3(3'-bromo-4'-nitrophenyl)propionic acid, 3(3',4'-dihydroxyphenyl)propionic acid alone or in combination. Further, information on sequestering and chelating agents is disclosed in T. E. Furia, CRC Handbook of Food Additives, $2^{nd}$ Edition, pp. 271-294 (1972), and M. S. Peterson and A. M. Johnson (Eds.), Encyclopedia of Food Science, pp. 694-699 (1978) are incorporated herein by reference in its entirety. The most preferred sequestering agent of the present application is glutamic acid-N,N-diacetic acid tetrasodium salt (GLDA-$Na_4$). The preferred usable range of chelating agent is from about 0.01 to 5.0% by weight, particularly 0.01 to 2% by weight, based on the total aqueous BIT composition.

The pH of the aqueous drilling mud composition of the present application is the range of from about 9.0 to about 13.0, preferably, from about 10 to about 12.

The aqueous drilling mud composition of the present application may comprise additional additives for improving the performance of drilling operations with respect to one or more properties. Examples of such additional additive ingredient selected from the group including but not limited to bactericides, detergents and emulsifiers, solid and liquid lubricants, gas-hydrate inhibitors, corrosion inhibitors, defoamers, scale inhibitors, enzymes, oxidising polymer-breakers, emulsified hydrophobic liquids such as oils, acid gas-scavengers (such as hydrogen sulfide scavengers), thinners (such as lignosulfonates), demulsifiers and surfactants designed to assist the clean-up of invaded fluid from producing formations, polymeric additives, dispersants, shale stabilizers or inhibitors, pH controlling agents, wetting agents, biopolymers, pH controlling agents or mixture thereof.

The aqueous drilling mud composition of the present application is particularly useful in oil-field drilling applications. The combination described herein may also find use in other oil well applications. For example, it may be used in application including, but not limited to, rheology modifier/thickener for drilling fluids and cementing, friction reducer (line, freshwater, salt water muds), shale sell inhibitor/clay stabilizer, viscosifier (fresh water, seawater, saline muds), filtration control, cementing retarder, oil well fracturing (e.g. friction reducer), oil well stimulation (viscosifier for acidizing), drilling aids (oil, water, geological drillings), completion fluids and workover fluids, and polymer flooding (enhanced oil recovery).

A particularly preferred embodiment of the present application provides a process for preparing an aqueous high-temperature high-pressure (HTHP) drilling mud composition comprising preparing a homogenous mixture of (i) about 20-80 wt % of 0-60% w/w brine solution (ii) about 0.1 wt. % to about 3 wt. % of butylated reaction product of p-cresol and dicyclopentadiene, a polymeric hindered phenol based antioxidant; (iii) about 0.1 wt. % to about 10.0 wt. % of triethanol amine, a chelating agent; (iv) (a) about 0.1 wt. % to about 10 wt. % of rheology modifier; and/or (b) about 0.5 wt. % to about 30 wt. % of fluid loss additive; (v) (a) about 20 wt. % to about 80 wt. % of weighting agent; and/or (b) about 0 wt. % to about 20.0 wt. % of drilling solid; and about 0 wt. % to about 50 wt % of water.

Accordingly, in a particularly useful embodiment of the present application there is provided a method of drilling a wellbore through a subterranean rock formation comprising (i) providing a drilling mud composition of present application; (ii) pumping said drilling mud composition down tubing in the wellbore and through nozzles in a drilling bit attached to the bottom end of the tubing while rotating the bit to detach cuttings from the rock formation; and (iii) transporting the cuttings up the annulus between the tubing and the wellbore wall, the cuttings transport being facilitated by the flow of synergistic mixture of rheology-modifier and fluid loss additive components of drilling mud composition.

Another embodiment of the present application provides a method of completing a wellbore that penetrates through a porous and permeable subterranean rock formation comprising (i) providing a completion drilling mud composition of present application; (ii) pumping said completion mud composition into the wellbore so that the formation fluid pressure and/or losses of completion fluid to the formation are controlled; and (iii) performing the operations required to complete the well.

In another embodiment, the present application provides a method of fracturing a rock formation comprising injecting a fracturing fluid into an wellbore across the rock formation that is to be fractured wherein the fracturing fluid comprises the composition of present application; and maintaining the pressure of the fracturing fluid at above the fracture pressure of the formation whereby the fractures grow and the drilling mud composition of present application assists the transport of the proppant particles along the fractures and reduces the rate of leak-off of the fluid into the rock formation.

Further, the present invention is illustrated in detail by way of the below given examples. The examples are given herein for illustration of the invention and are not intended to be limiting thereof.

Example 1: Preparation of Drilling Mud Compositions

A ~12.0 ppg drilling fluid formulation as described in Tables 1-1 and Table 1-2 was made on a 600 g scale containing weighting agents, rheology modifier (XxtraDura RM 400), and fluid loss control additives (XxtraDura FLA400) as shown in following Tables 1-1, 1-2. Sufficient mixing was required to facilitate dissolving of the polymer and avoid local viscosified agglomerates (fish eyes). The drilling fluids were allowed to agitate for 5-15 minutes between the addition of each component and with 30-50 minutes total for complete and homogenous mixing. Rheological properties were then measured on Fann 35 before and after hot rolling (BHR and AHR) aging tests.

TABLE 1-1

Mud formulation using RM 400, RM400/FLA400, and FLA 400

| | | Formulation (g) | | |
|---|---|---|---|---|
| Ingredient | Mix Time | A | B | C |
| 15% KCl Brine | | 365 | 365 | 365 |
| Improved Xxtradura RM400* | 15 min | 30 | 8 | — |
| Improved Xxtradura RM400** | 15 min | | 25 | 40 |
| Barite | 10 min | 190 | 190 | 190 |
| Hymod Prima clay | Add with barite | 15 | 15 | 15 |
| pH | | 10-10.5 | 10-10.5 | 10-10.5 |

*Improved RM400: RM400 is premixed with 2-2.5 wt % AO and ~5 wt % chelating agent based on "as is" polymer total weight.
**Improved FLA 400: FLA 400 is premixed with chelating agent at ~5 wt % based on "as is" polymer weight.
Antioxidant (AO) is polyhindered phenol, CAS# 68610-51-5 and Chelating agent: Triethanolamine.

TABLE 1-2

Mud formulation using RM400 and FLA400

| | | Formulation (g) | | |
|---|---|---|---|---|
| Ingredient | Mix Time | A | B | C |
| 15% KCl Brine | | 365 | 365 | 365 |
| Antioxidant* | 1 min | 1 | 1 | 1 |
| Chelating Agent* | 1 min | 1.5-2 | 1.5-2 | 1.5-2 |
| Original Xxtradura RM400** | 15 min | 30 | 8 | — |
| Original Xxtradura FLA400** | 15 min | | 25 | 40 |
| Barite | 10 min | 190 | 190 | 190 |
| Hymod prima clay | Add with barite | 15 | 15 | 15 |
| pH | 10 min | 10-10.5 | 10-10.5 | 10-10.5 |

*AO is polyhindered phenol and chelating agent (triethanolamine) was added before RM400 and FLA400.
**RM400/FLA 400 themselves do not contain AO or Chelating agent.

Example 2: Effect of Antioxidant on Rheology Modifier and/or Fluid Loss Additive Agents at 350 F Aging (Thermal Stability Test)

The effect of antioxidant on (1) RM400, a Rheology Modifier dispersion, (2) RM 400 powder, and (3) FLA400, a Fluid Loss Additive (dispersion) were duly explored, and wherein the thermal stability experiment was performed at 350 F. The analytical experimental data showed that the hindered polyphenol (CAS #68610-51-5) is capable of retaining original properties of respective RM 400 and FLA 400. Results showed absence of hydrolysis of polymers, no drop in molecular weights, and absence of antimicrobial growth. Further, it is observed that the polyhindered phenol helped in the thermal stability of aging testing, and wherein, the aging performance was similar as freshly made polymers. Polyhindered phenols improved the shelf life of RM 400 dispersion/powder and FLA400 dispersion (Tables 2-4).

The dosage of polyhindered phenol for the study of antioxidant effect on rheology modifier (RM400) at 350 F was arrived from an appropriate dosage study

TABLE 5

The effective amount of dosage of antioxidant for improving performance of RM400 in 600 g mud is from about 0.5 g to 1.0 g.

| Fann data | 1% 2059R (After 4 months of shelf life) | | 1% 2059R + AO (After 4 months shelf life) | | 1% 2151R + AO (After 4 months of shelf life) | | 1% 2059R (Fresh made) | |
|---|---|---|---|---|---|---|---|---|
| | BHR | AHR | BHR | AHR | BHR | AHR | BHR | AHR |
| 3 rpm | 10 | 2 | 12 | 6 | 12 | 9 | 14 | 6 |
| 6 rpm | 16 | 2.5 | 23 | 10 | 17 | 15 | 19 | 10 |
| 100 rpm | 71 | 13 | 73 | 58 | 71 | 85 | 66 | 61 |
| 200 rpm | 99 | 24 | 94 | 86 | 95 | 110 | 89 | 88 |
| 300 rpm | 115 | 37 | 108 | 112 | 111 | 133 | 107 | 109 |
| 600 rpm | 155 | 69 | 141 | 155 | 147 | 171 | 145 | 149 |
| PV | 40 | 32 | 33 | 43 | 36 | 38 | 38 | 40 |
| YP | 75 | 5 | 75 | 69 | 75 | 95 | 69 | 69 |

TABLE 2

Effect of AO on RM 400 dispersion_thermal stability at 350 F. aging

| Fann data | 1% IRS 6854R (3 months shelf life) | | 1% IRS 6854 + AO (3 months shelf life) | |
|---|---|---|---|---|
| | BHR | AHR | BHR | AHR |
| 3 rpm | 4 | 3 | 6.5 | 7 |

TABLE 3

Effect of AO on RM400 powder thermal stability at 350 F. aging

| Fann data | 1% RM400 Powder (4 months shelf life, test 1) | | 1% RM400 Powder (4 months shelf life, test 2) | | 1% RM400 Powder + AO (4 months shelf life, test 1) | | 1% RM400 Powder + AO (4 months shelf life, test 2) | |
|---|---|---|---|---|---|---|---|---|
| | BHR | AHR | BHR | AHR | BHR | AHR | BHR | AHR |
| 3 rpm | 12 | 2 | 5 | 1.5 | 24 | 6 | 11 | 6 |
| 6 rpm | 24 | 2.5 | 8 | 2 | 36 | 10 | 31 | 11 |

TABLE 3-continued

Effect of AO on RM400 powder thermal stability at 350 F. aging

| Fann data | 1% RM400 Powder (4 months shelf life, test 1) | | 1% RM400 Powder (4 months shelf life, test 2) | | 1% RM400 Powder + AO (4 months shelf life, test 1) | | 1% RM400 Powder + AO (4 months shelf life, test 2) | |
|---|---|---|---|---|---|---|---|---|
| | BHR | AHR | BHR | AHR | BHR | AHR | BHR | AHR |
| 100 rpm | 114 | 21 | 56 | 20 | 120 | 86 | 117 | 87 |
| 200 rpm | 150 | 35 | 87 | 38 | 152 | 127 | 150 | 128 |
| 300 rpm | 175 | 50 | 110 | 55 | 175 | 165 | 176 | 161 |
| 600 rpm | 230 | 91 | 156 | 96 | 231 | 227 | 232 | 223 |
| PV | 55 | 41 | 46 | 41 | 56 | 62 | 56 | 62 |
| YP | 120 | 09 | 64 | 14 | 119 | 103 | 120 | 99 |

TABLE 4

Effect of AO on FLA 400 (dispersion polymer) thermal stability at 350 F. aging

| 6 rpm | 7 | 4 | 10 | 11 |
|---|---|---|---|---|
| 100 rpm | 53 | 37 | 58 | 70 |
| 200 rpm | 79 | 60 | 84 | 98 |
| 300 rpm | 100 | 78 | 103 | 118 |
| 600 rpm | 146 | 119 | 146 | 163 |
| PV | 46 | 41 | 43 | 45 |
| YP | 54 | 37 | 60 | 73 |
| HTHP FL | | 8 ml/30 min | | 6 ml/30 min |

TABLE 5

Antioxidant (Polyhindered Phenol) dosage study

1% 2151R Powder (in 600 g mud)

| Fann data | No AO | | 0.25 g AO | | 0.5 g AO | | 1.0 g AO | |
|---|---|---|---|---|---|---|---|---|
| | BHR | AHR | BHR | AHR | BHR | AHR | BHR | AHR |
| 3 rpm | 12 | 2 | 14 | 2 | 11 | 6 | 24 | 6 |
| 6 rpm | 24 | 2.5 | 29 | 4 | 31 | 11 | 36 | 10 |
| 100 rpm | 114 | 21 | 118 | 36 | 117 | 87 | 120 | 86 |
| 200 rpm | 150 | 35 | 150 | 45 | 150 | 128 | 152 | 127 |
| 300 rpm | 175 | 50 | 176 | 63 | 176 | 161 | 175 | 165 |
| 600 rpm | 230 | 91 | 231 | 116 | 232 | 223 | 231 | 227 |
| PV | 55 | 41 | 55 | 53 | 56 | 62 | 56 | 62 |
| YP | 120 | 9 | 121 | 10 | 120 | 99 | 119 | 103 |

Example 3: Effect of Chelating Agent on Rheology Modifier (RM400)

The effect of chelating on RM400, a Rheology Modifier was performed in presence of high iron content barite (~11%), a preferred weighting agent of the present application (Table 6). The dosage level of triethanolamine for the study of chelating effect on rheology modifier (RM400) was determined from a dosage study (Table 7). The effective dosage amount of chelating agent for improving performance of RM400 in 600 g mud is from about 1.0 g to 2.0 g. Chelating agent (1-10 g) also retains the properties of RM400 during thermal aging performance at 350 F in 600 g of 12.5 ppg mud composition.

TABLE 6

Chelating agent effect on RM400 in presence of high Iron content Barite (~11%)

| 350 F./16 hr Mud aging | 1% Original RM400 (no chelating agent, no AO) | | 1% RM400+ chelating agent | |
|---|---|---|---|---|
| FANN data | BHR | AHR | BHR | AHR |
| 3 rpm | 11 | 2 | 11 | 6 |
| 6 rpm | 16 | 2.5 | 16 | 8.5 |
| 100 rpm | 70 | 14 | 65 | 54 |
| 200 rpm | 95 | 16 | 88 | 82 |
| 300 rpm | 100 | 18 | 105 | 115 |
| 600 rpm | 145 | 26 | 142 | 155 |
| PV (cps) | 49 | 3 | 43 | 41 |
| YP (lb/100 ft$^2$) | 53 | 2 | 48 | 37 |

Example 4: HPHT Fluid Loss Test on Drilling Mud Formulations (A-C)

The drilling fluid muds were prepared from the formulation provided in Tables 1-1 and 1-2 and sealed in OFITE stainless cells under N$_2$ pressure of 150 psi for 350° F. for 16 hours aging. HTHP fluid loss tests on drilling fluid formulations were conducted in accordance with the procedures detailed in API RP 13B-1. Before hot rolling (BHR) and after hot rolling (AHR) rheology results and HTHP Fluid loss control properties are provided in Tables 2-4, 8-10

The Tables 2 results show Fann viscosity data for 4 formulations for before hot rolling (BHR) and after hot rolling (AHR) test conditions. The first sample, "1% Original RM400" did not contain any antioxidant (AO) or chelating agent, and the AHR viscosities were undesirably lower than the BHR values. However, the second and third formula of the invention show the AHR viscosity data are about the same as or higher than the BHR; these two formulas contained antioxidant. The fourth formulation contains fresh made RM 400, does not contain antioxidant.

OFITE Aging Cells are patented pressure vessels that enable samples to be subjected to temperatures higher than the boiling point of water and still be maintained in a liquid state. The cells may be used for static temperature exposure or in a dynamic mode in a roller oven with a normal minimum aging time of 16 hours. The mud formulations described herein were directly aged in 500 ml OFITE 316 grade stainless cells in a OFITE roller oven.

TABLE 7

Study of chelating agent (CA) dosage level

| | 1% RM400+ | | | | | | | | | | | | | |
|---|---|---|---|---|---|---|---|---|---|---|---|---|---|---|
| | (no AO, no CA) | | AO + 1 g CA | | AO + 2 g CA | | AO + 4 g CA | | AO + 6 g CA | | AO + 8 g CA | | AO + 10 g CA | |
| Fann | BHR | AHR | BHR | AHR | BHR | AHR | BHR | AHR | BHR | AHR | BHR | AHR | BHR | AHR |
| 3 rpm | 10 | 2 | 10 | 8 | 12 | 12 | 12 | 15 | 12 | 12 | 11 | 12 | 9 | 10 |
| 6 rpm | 16 | 2.5 | 15 | 14 | 19 | 20 | 18 | 24 | 19 | 20 | 17 | 20 | 13.5 | 17 |
| 100 rpm | 71 | 13 | 70 | 85 | 73 | 95 | 74 | 100 | 74 | 98 | 71 | 95 | 62 | 90 |
| 200 rpm | 99 | 24 | 94 | 116 | 96 | 122 | 99 | 123 | 99 | 125 | 93 | 118 | 84.5 | 122 |
| 300 rpm | 115 | 37 | 110 | 135 | 109 | 142 | 117 | 143 | 116 | 146 | 109 | 137 | 100 | 140 |
| 600 rpm | 155 | 69 | 146 | 188 | 148 | 186 | 156 | 186 | 153 | 192 | 148 | 179 | 136 | 186 |
| PV | 40 | 32 | 36 | 53 | 39 | 44 | 39 | 43 | 37 | 46 | 39 | 42 | 36 | 46 |
| YP | 75 | 5 | 74 | 82 | 80 | 98 | 78 | 100 | 79 | 100 | 70 | 95 | 64 | 94 |

TABLE 8

Effect of Antioxidant (AO) and chelating agent on RM400 dispersion thermal stability at 350 F. aging (Formulation A, Table 1-2)

| | 1% RM400 (no AO, no chelating, | | 1% RM400 + AO (no chelating) | | 1% RM400 + Chelating (no AO) | | 1% RM 400 + AO + chelating | | 1% RM 400 + AO + chelating | | 1% RM 400 + AO + chelating | |
|---|---|---|---|---|---|---|---|---|---|---|---|---|
| Fann data | BHR | AHR | BHR | AHR | BHR | AHR | BHR | AHR | BHR | AHR | BHR | AHR |
| 3 rpm | 10 | 2 | 8 | 3.5 | 10 | 6 | 10 | 9 | 9 | 10 | 8 | 7 |
| 6 rpm | 16 | 2.5 | 13 | 5 | 15 | 10 | 14.5 | 16 | 13.5 | 17 | 12 | 13 |
| 100 rpm | 71 | 13 | 65 | 22 | 62 | 63 | 62 | 90 | 62 | 90 | 61 | 85 |
| 200 rpm | 99 | 24 | 90 | 37 | 83 | 93 | 85 | 119 | 84.5 | 122 | 85 | 113 |
| 300 rpm | 115 | 37 | 108 | 54 | 101 | 115 | 102 | 140 | 100 | 140 | 102 | 134 |
| 600 rpm | 155 | 69 | 146 | 91 | 142 | 157 | 144 | 188 | 136 | 186 | 138 | 182 |
| PV (cps) | 40 | 32 | 38 | 37 | 41 | 42 | 38 | 48 | 36 | 46 | 36 | 48 |
| YP (lb/100 ft$^2$) | 75 | 5 | 70 | 17 | 60 | 73 | 64 | 92 | 64 | 94 | 66 | 86 |

TABLE 9

"Improved FLA 400" in Mud testing (Formulation C, Table 1-2)

| 350 F./16 hr mud aging Fann 35 | 1.4% Original FLA400* | | 1.4% "Improved FLA400"** | | 1.4% "Improved FLA400"*** | |
|---|---|---|---|---|---|---|
| Viscosity data | BHR | AHR | BHR | AHR | BHR | AHR |
| 3 rpm | 5 | 3.5 | 5 | 9 | 5 | 7 |
| 6 rpm | 8 | 6 | 8 | 15 | 905 | 12 |
| 100 rpm | 61 | 49 | 59 | 90 | 60 | 71 |
| 200 rpm | 91 | 77 | 93 | 129 | 89 | 102 |
| 300 rpm | 114 | 101 | 117 | 160 | 112 | 123 |
| 600 rpm | 168 | 150 | 172 | 225 | 161 | 177 |
| PV | 54 | 49 | 55 | 65 | 49 | 54 |
| YP | 60 | 52 | 62 | 95 | 63 | 69 |
| HTHP FL, ml/30 min, 250 F., 500 psi | — | 6.6 | — | — | — | — |

*Original FLA400 does not contain AO or chelating.
**Improved FLA400 is premixed with ~5% chelating agent (Formulation Table 1-1).
***AO and chelating agent are added directly into mud before original FLA400. (Formulation, Table 1-2)

TABLE 10

Improved RM400/FLA400 in mud testing (Formulation B, Table 1-2)

| 350 F./16 hr mud aging | Original RM400/ FLA400* | | Improved RM400/ FLA400** | | Improved RM400/ FLA400*** | | Improved RM400/ FLA400*** | | Improved RM400/ FLA400** Using 15% NaCl | |
|---|---|---|---|---|---|---|---|---|---|---|
| Fann | BHR | AHR | BHR | AHR | BHR | AHR | BHR | AHR | BHR | AHR |
| 3 rpm | 7 | 2.5 | 6 | 13 | 7 | 6 | 7 | 12 | 6.5 | 7 |
| 6 rpm | 10 | 5.5 | 9 | 19 | 10 | 9 | 12 | 20 | 8 | 12 |
| 100 rpm | 50 | 14 | 56 | 87 | 50 | 52 | 79 | 107 | 55 | 83 |
| 200 rpm | 82 | 25 | 78 | 120 | 80 | 79 | 115 | 149 | 88 | 119 |
| 300 rpm | 96 | 35 | 96 | 141 | 96 | 102 | 141 | 180 | 108 | 144 |
| 600 rpm | 139 | 64 | 143 | 182 | 139 | 153 | 199 | 243 | 149 | 196 |
| PV | 43 | 29 | 47 | 41 | 43 | 51 | 58 | 63 | 31 | 52 |
| YP | 53 | 6 | 49 | 100 | 53 | 51 | 83 | 117 | 77 | 92 |

*Original RM400/FLA400 does not contain AO or chelating agent (CA).
**Improved RM400 is premixed with 2-2.5% AO and 5% chelating agent (CA), Improved FLA400 is premixed with ~5% chelating agent. (Formulation Table 1-1)
***AO and CA were added individually into mud before original RM400/FLA400.

While this invention has been described in detail with reference to certain preferred embodiments, it should be appreciated that the present invention is not limited to those precise embodiments. Rather, in view of the present disclosure, which describes the current best mode for practicing the invention, many modifications and variations would present themselves to those skilled in the art without departing from the scope and spirit of this invention.

What is claimed is:

1. An aqueous high-temperature high-pressure (HTHP) stable drilling mud composition comprising:
   i. about 20 wt. % to about 80 wt. % of 0-60% w/w brine solution;
   ii. about 0.1 wt. % to about 3 wt. % of butylated reaction product of p-cresol and dicyclopentadiene;
   iii. about 0.1 wt. % to about 10.0 wt. % of triethanol amine;
   iv. (a) about 0.1 wt. % to about 10 wt. % of rheology modifier (RM); and (b) about 0.5 wt. % to about 30 wt. % of fluid loss additive (FLA), wherein said fluid loss additive (FLA) is a terpolymer of (a) about 30 to about 70 wt. % of acrylamide (AM), (b) about 30 to about 70 wt. % of 2-acrylamido-2-methyl propanesulfonic acid (AMPS), salts thereof, and (c) about 2.0 to about 50 wt. % of cationic monomer selected from the group consisting of quaternized (meth)acrylate monomers, quaternized (meth)acrylamide monomers, diallyldimethyl ammonium chloride (DADMAC), dimethylaminoethyl methacrylate (DMAEMA), 3-methacryloyloxy-2-hydroxypropyl-trimethylammonium chloride, 3-acrylamido-3-methylbutyl-trimethyl ammonium chloride, N-methyl-2-vinyl pyridinium methyl sulfate, N-propyl acrylamido trimethylammonium chloride, 2-methacryloyloxy-ethyl trimethyl ammonium methosulfate, acrylamidopropyltrimethylammonium chloride (APTAC), methacrylamidopropyltrimethylammonium chloride (MAPTAC), and combinations thereof;
   v. about 20 wt. % to about 80 wt. % of weighting agent;
   vi. about 0 wt. % to about 20 wt. % of drilling solid; and
   vii. about 0 wtyryy. % to about 50 wt % of water.

2. The aqueous drilling mud composition according to claim 1, further optionally comprises at least one additive ingredient selected from the group consisting of polymeric additives, dispersants, shale stabilizers or inhibitors, pH controlling agents, emulsifiers, wetting agents, surfactants, corrosion inhibitors, lubricants, biopolymers and mixture thereof.

3. The aqueous drilling mud composition according to claim 1, wherein said rheology modifier (RM) is selected from the group consisting of:
   i. a terpolymer of (a) about 30 to about 70 wt. % of acrylamide (AM) (b) about 30 wt. % to about 70 wt. % of 2-acrylamido-2-methyl propanesulfonic acid (AMPS) and or salts thereof, and (c) about 0.01 to about 5 wt. % of hydrophobe; and
   ii. a terpolymer of (a) about 30 to about 70 wt. % of acrylamide (AM) (b) about 30 to about 70 wt. % of 2-acrylamido-2-methyl propanesulfonic acid (AMPS) and or salts thereof, and (c) about 0.01 to about 5 wt. % of long-chain $C_{12-25}$ alkyl acrylate selected from n-lauryl acrylate, n-hexadecyl acrylate, or n-stearyl acrylate.

4. The aqueous drilling mud composition according to claim 1, wherein said weighting agent is selected from the group consisting of barite, hematite, manganese oxide, iron oxide, sized calcium carbonate, magnesium carbonate, aqueous soluble organic and inorganic salts and mixtures thereof.

5. The aqueous drilling mud composition according to claim 1, wherein said brine solution is prepared from sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

6. The aqueous drilling mud composition according to claim 1, wherein said drilling solid is a finely divided clay particle selected from the group consisting of bentonite, sodium bentonite, attapulgite, sepiolite, saponite, hectorite and mixtures thereof.

7. The aqueous drilling mud composition according to claim 1, wherein said Fluid Loss Additive (FLA) component has a weight-average molecular weight of (a) at least 3,000 Da or (b) more particularly from 500,000 Da to 10,000,000 Da.

8. The aqueous drilling mud composition according to claim 1, wherein said Rheology Modifier component has a weight-average molecular weight of (a) at least 1,000,000 Da or (b) 2,000,000 Da to 20,000,000 Da.

9. The aqueous drilling mud composition according to claim 1 suitable for high-temperature high-pressure (HTHP) drilling operations of >300° F. temperature.

10. The aqueous drilling mud composition according to claim 1 having a pH of from about 9.0 to about 12.0.

11. An aqueous high-temperature high-pressure (HTHP) stable drilling mud composition comprising:
   i. about 20 wt. % to about 80 wt. % of 15% w/w potassium chloride brine solution;
   ii. about 0.1 wt. % to about 3 wt. % of butylated reaction product of p-cresol and dicyclopentadiene;
   iii. about 0.1 wt. % to about 3.0 wt. % of triethanol amine; and
   iv. (a) about 0.1 wt. % to about 10 wt. % of rheology modifier; and (b) about 0.5 wt. % to about 20 wt. % of fluid loss additive (FLA), wherein said fluid loss additive (FLA) is a terpolymer of (a) about 30 to about 70 wt. % of acrylamide (AM), (b) about 30 to about 70 wt. % of 2-acrylamido-2-methyl propanesulfonic acid (AMPS), salts thereof, and (c) about 2.0 to about 50 wt. % of cationic monomer selected from the group consisting of quaternized (meth)acrylate monomers, quaternized (meth)acrylamide monomers, diallyldimethyl ammonium chloride (DADMAC), dimethylaminoethyl methacrylate (DMAEMA), 3-methacryloyloxy-2-hydroxypropyl-trimethylammonium chloride, 3-acrylamido-3-methylbutyl-trimethyl ammonium chloride, N-methyl-2-vinyl pyridinium methyl sulfate, N-propyl acrylamido trimethylammonium chloride, 2-methacryloyloxy-ethyl trimethyl ammonium methosulfate, acrylamidopropyltrimethylammonium chloride (APTAC), methacrylamidopropyltrimethylammonium chloride (MAPTAC), and combinations thereof;
   v. about 20 wt. % to about 60 wt. % of barite, a weighting agent;
   vi. about 0 wt. % to about 10 wt. % of clay, a drilling solid; and
   vii. about 0 wt. % to about 20 wt. % of water.

12. The aqueous drilling mud composition according to claim 11, wherein said rheology modifier (RM) is a terpolymer of (i) about 49 wt. % of acrylamide (ACM) (ii) about 49 wt. % of sodium salt of 2-acrylamido-2-methyl propanesulfonic acid (NaAMPS), and (iii) 2 wt. % of stearyl acrylate.

13. The aqueous drilling mud composition according to claim 11, further optionally comprises at least one additive ingredient selected from the group consisting of polymeric additives, dispersants, shale stabilizers or inhibitors, pH controlling agents, emulsifiers, wetting agents, surfactants, corrosion inhibitors, lubricants, biopolymers and mixture thereof.

14. The aqueous drilling mud composition according to claim 11, wherein said Fluid Loss Additive (FLA) component has a weight-average molecular weight of (a) at least 3,000 Da or (b) 500,000 Da to 10,000,000 Da.

15. The aqueous drilling mud composition according to claim 11, wherein said Rheology Modifier component has a weight-average molecular weight of (a) at least 1,000,000 Da or (b) 2,000,000 Da to 20,000,000 Da.

16. The aqueous drilling mud composition according to claim 11 suitable for high-temperature high-pressure (HTHP) drilling operations of >300° F. temperature.

17. The aqueous drilling mud composition according to claim 11 having a pH of from about 9.0 to about 13.0.

* * * * *